United States Patent
Jordil et al.

(10) Patent No.: US 9,728,079 B2
(45) Date of Patent: Aug. 8, 2017

(54) INSTRUMENT FOR MEASURING DIMENSIONS EQUIPPED WITH AN INTERFACE AND CORRESPONDING INTERFACE

(75) Inventors: Pascal Jordil, Ecoteaux (CH); Serge Mariller, Cheseaux-sur-Lausanne (CH)

(73) Assignee: TESA SA, Renens (CH)

(*) Notice: Subject to any disclaimer, the term of this patent is extended or adjusted under 35 U.S.C. 154(b) by 1053 days.

(21) Appl. No.: 13/357,220

(22) Filed: Jan. 24, 2012

(65) Prior Publication Data

US 2012/0203504 A1    Aug. 9, 2012

(30) Foreign Application Priority Data

Feb. 8, 2011 (EP) .................................... 11153688

(51) Int. Cl.
*G06F 15/00* (2006.01)
*G08C 17/02* (2006.01)
*G01B 3/20* (2006.01)

(52) U.S. Cl.
CPC ............ *G08C 17/02* (2013.01); *G01B 3/205* (2013.01); *G01B 2210/58* (2013.01)

(58) Field of Classification Search
CPC ...................................................... G01B 3/205
See application file for complete search history.

(56) References Cited

U.S. PATENT DOCUMENTS

| | | | |
|---|---|---|---|
| 4,930,096 A * | 5/1990 | Shimizu et al. ............. | 340/9.16 |
| 5,008,665 A | 4/1991 | Wakatsuki et al. | |
| 6,502,057 B1 | 12/2002 | Suzuki | |
| 2008/0177503 A1 | 7/2008 | Stockman | |
| 2011/0100866 A1* | 5/2011 | Gueret .......................... | 206/581 |
| 2011/0305498 A1* | 12/2011 | De La Rosa ................ | 401/195 |

FOREIGN PATENT DOCUMENTS

| | | |
|---|---|---|
| CN | 101655403 | 2/2010 |
| EP | 0974808 | 1/2000 |
| EP | 1859906 | 11/2007 |
| GB | 2326002 | 12/1998 |
| WO | 98/51990 | 11/1998 |
| WO | 2007/052504 | 5/2007 |

OTHER PUBLICATIONS

Digit-Star, EZ2400, Jun. 12, 2010, 29 pages.*
EP Application No. 11 15 3688 European Search Report dated May 2, 2011.

* cited by examiner

*Primary Examiner* — Tung Lau
(74) *Attorney, Agent, or Firm* — Maschoff Brennan (57) ABSTRACT

Electronic measuring instrument equipped with a removable intelligent processing and radio communication interface. The interface allows managing additional features such as bidirectional communication of commands and measurement data with printers, computers or other external devices, as well as the transmission of instructions or measurement programs to the instrument. The radio interface may be connected with several measuring instruments such as callipers, micrometers, comparators or height gauges. It is integrated into the lid of the battery compartment of the instrument, so that it can be installed and removed easily and without impairing the seal. The cover also includes an extra battery for the processing and radio transmission interface.

14 Claims, 4 Drawing Sheets

INSTRUMENT FOR MEASURING DIMENSIONS EQUIPPED WITH AN INTERFACE AND CORRESPONDING INTERFACE

REFERENCE DATA

The present invention claims priority of European patent application EP11153688.4 filed on Feb. 8, 2011, the contents of which are hereby incorporated by reference herein.

TECHNICAL FIELD

The present invention concerns a plug of a portable measuring instrument in the field of dimensional metrology, for portable or semi-portable measuring instruments that are not connected to data processing equipment, such as for example calipers, micrometers for internal or external measurements, probes, comparators, height gauges etc. More precisely, the present invention concerns a communication interface that adapts on the portable measuring instrument so as to hardly modify the ergonomics and not at all modify the operation of the instrument. Furthermore, it serves to extend the capabilities of processing data and transmitting data to external equipment, such as for example a computer, to collect process and control the measurements.

STATE OF THE ART

Several examples of electronic sliding calipers with a communication interface are known from the prior art. They use for example asynchronous serial communication interfaces according to the standard RS232, and a serial connector, enabling measurement data to be transmitted to a printer or a computer. The connection cable, however, considerably restricts the ease with which the instrument can be handled and serves only for one-directional communication. In a sealed instrument, the connector is furthermore sensitive to poor contacts and also constitutes a potential point of access for water or dust. EP980506, for example, describes an electronic-type precision caliper comprising a magnetic ruler and a magnetorestistive-type reading system, wherein the system has a compartment for inserting an optoelectronic serial interface to communicate with a computer whilst maintaining the instrument's tightness. This however requires special interfaces and specialized cables provided with adaptors and converters for each manufacturer and each kind of apparatus.

Document U.S. Pat. No. 5,008,665 describes a sliding caliper having a radio emitter integrated within the measuring circuit. This device enables the measurements to be transmitted to an external device in a one-directional manner by radio connection. The emitter is powered by the button battery of the measuring instrument, thus reducing the instrument's autonomy and impairing its accuracy.

Document U.S. Pat. No. 6,502,057 describes an electronic caliper with a removable radio emitter that is fastened onto the slide by means of a proprietary locking system and connected to the measuring circuit over a dedicated connector. The emitter considerably increases the instrument's volume and the connector constitutes a potential access point for water or dust. Furthermore, it is adapted to a limited number of instruments due to its fastening system and the use of a trigger button.

GB2326002 describes a measuring instrument installed in a well in the ground and comprising a radio interface.

EP1859906 discloses a wireless transmission system into a torque-measuring wrench, with a battery into the handle and an electronic circuit in an enclosure delimited by a flat cover.

BRIEF SUMMARY OF THE INVENTION

One aim of the present invention is to propose a communication interface having the characteristics of the corresponding claim and that adapts to electronic calipers as well as to other portable electronic measuring instruments, without requiring a specialized external connector technology whilst ensuring the instrument remains sealed. The communication element is designed to afford the possibility of communicating through an interface that can be installed onto the instrument in an existing sealed compartment and that extends the instrument's possibilities without however modifying its appearance or handling.

The interface can be of wireless type or can be provided with a wired system, it is integrated in a sealed space of the instrument in order to transmit information in a bidirectional fashion to external equipment. The interface is included in a sealed volume, formed by the instrument's lid and battery compartment. An opening system makes it possible to access the instrument's different batteries and the transmission element. In the case of a wired transmission, the system can receive power through the wires.

In a variant embodiment, the interface is adapted for transmitting measuring data to a mobile receiver that is temporarily lodged inside the sealed volume, such as for example a miniature memory card of the MicroSD type. The transmission element can also include or be replaced by data processing elements.

The interface will preferably retrieve the data originating from the instrument and, by means of a system capable of deciding and processing, it will perform the required processing operations in an autonomous fashion. This means it will perform the necessary storing, processing, converting, correcting or transmitting operations according to the user's choice and, even should additional measurements be added, the user will be able to add a correction specific to the environment that will be able to qualify the measurement through the additional module present in the battery compartment.

The instruments are capable of transmitting data when a button of the instrument is actuated. This function can be used with the invention, but the instrument can also operate in continuous transmission mode, or in a minimum or maximum search mode, or in a combined measuring mode or in a serial measuring mode according to a pre-established plan. In all these cases, the user can choose the operating mode and can thus send the information regularly or store them temporarily and transmit them deliberately. Furthermore, the instrument's measuring and processing system can be reprogrammed in certain cases, to accept a certain number of new functions and to allow certain of the additional functions of the added module to be selected. The aim of this reprogramming is to be able to extend the user interface and thus grant access to the display and to the buttons for the new functions and allow the user to interact, through the instrument, with the added module. Thus, when the measurements are controlled by a measuring program originating from the machining programs or design drawings, the user can control the operation or remedy measuring errors by reallocating if necessary the use of the available buttons. This allows, among others, the instrument's user interface to interact with the invention in each mode in an adequate and simple manner.

In this operating mode, it is possible to display messages or alerts or to access functions of the invention and to select measurement programs by means of the instrument's conventional buttons. In the case where the instrument is not reprogrammable, it is always possible to interact with the module through external connections, to install programs and launch the execution of operations and programming commands. In the case where the display cannot be addressed through the invention or where it can be read only with difficulty, one will turn more towards audio or visual warning means that make it possible to do without the instrument's display, or towards another system enabling the latter to be moved into an area that is accessible to the user.

The external display can serve to manage and program simultaneously one or several remote instruments and can include a more extended user interface than that of the instrument, in order for example to trigger pre-programmed functions or execute instruction programs for the invention.

It is thus one aim of the invention to propose a portable measuring instrument according to the corresponding claim, wherein the measuring autonomy of the instrument running on battery is not reduced or altered by the presence of an energy-consuming interface or one that is disruptive during data transmission. It is for this reason that the interface is provided with a second power source dedicated to this processing and transmission element, so that the measuring system is not disturbed nor called upon by the invention. Furthermore, the interconnection is executed so as to reduce the power consumption by comparison with the existing systems by means of opto-couplers or unpowered wired connections. Furthermore, in case of power failures of the transmission module, the normal operation of the instrument is maintained if the user wishes to continue without transmission.

A further aim of the invention is to propose a measuring instrument that affords a more flexible and ergonomic modularity of the data processing and transmission systems than in the prior art, and thus that extends the operation possibilities of the portable measuring instruments without however modifying the handling or use of the instrument, but seeking to integrate into the existing format additional features thanks to the contents of the invention, thus enabling the measurement accuracy and quality of portable devices to be improved.

According to the invention, these aims are achieved notably by means of the object of the principal claim.

Hereinafter in the present description, reference is made to a precision caliper. It must however be understood that this does not constitute an essential limitation of the invention to this type of instrument, any portable electronic measuring instrument is included that is capable of being equipped with the invention and capable of processing or transmitting data mentioned in the characterizing part of claim 1, such as for example micrometers, comparators, probes and more generally electronic measuring apparatus that are generally autonomous and that can optionally be connected to computer equipment.

When the present invention mentions electric batteries, it must also be understood that this does not represent a limiting characteristic of the invention, and the batteries can be replaced with a suitable stable electric power source brought in from the outside or one that is autonomous, without falling outside the scope of the invention. One can mention, by way of non-exhaustive examples of autonomous power sources: rechargeable accumulators, for example LiPO (Lithium Polymer), Li-ion, Ni-MH, generators converting mechanical energy into electric energy or photovoltaic modules.

Furthermore, it is not a limiting characteristic to have two separate power sources, it is also possible to have a common power source, in particular when the usage mode is not included in the conventional functions of the instrument and one does not wish to maintain other operating modes than those using the transmission. By contrast, in this latter case, in order to maintain the accuracy of the measurement, the battery discharge will be limited in order to guarantee correct measuring conditions.

BRIEF DESCRIPTION OF THE FIGURES

Examples of embodiments of the invention are indicated in the description illustrated by the attached figures in which.

EXAMPLE(S) OF EMBODIMENTS OF THE INVENTION

Figure 1:
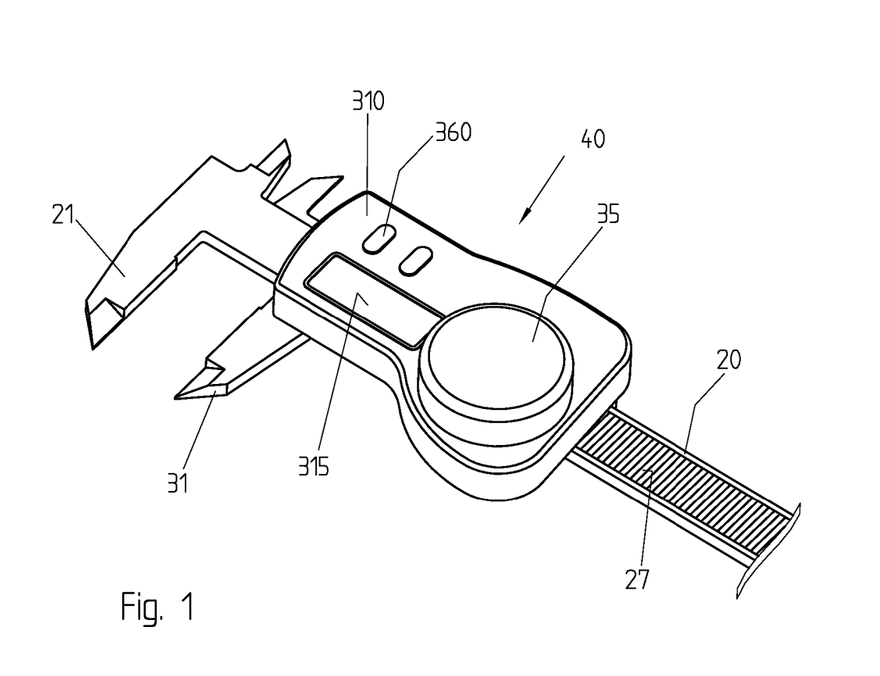
FIG. 1 illustrates diagrammatically an electronic caliper according to one aspect of the invention.

According to the embodiment of the invention illustrated in FIG. 1, a communication interface is mounted onto the caliper 40 comprising a shaft 20 on which a slide 30 can move longitudinally. The shaft can have different lengths according to the intended use of the instrument, for example 20 cm, and is provided with a fixed jaw 21 whilst the slide carries a mobile jaw 31 that moves parallel to the fixed jaw 21 along the shaft 20 with the slide. The display 315 indicates a measurement depending on the distance between the fixed jaw 21 and the mobile jaw 31.

In the embodiment illustrated, the shaft 20 comprises a magnetic rule 27 on the portion of the shaft 20 over which the slide 30 is capable of being displaced. The slide includes an electronic measuring circuit 320, visible in FIGS. 2 and 4, equipped with a magnetic sensor 327 sensitive to variations of the magnetic field generated by displacing the slide 30 relative to the shaft 20, and arranged so as to determine the value of the distance between the jaws 21, 31. The instrument displays the measured value, and a push button 360 makes it possible to trigger the transmission of the measurement to an external device, over a processing and radio wave transmission interface, or to a removable internal storage means. A detailed description of this part of the invention is presented for example in EP980506 mentioned above and incorporated herewith by way of reference.

Furthermore, the inventive instrument could use, instead of a magnetic sensor system, a system with an optical or capacitive sensor, or any other suitable system for encoding the position or orientation or any other combination of sensor and reference that can be moved relatively to one another, enabling it to deduce and measure a linear or angular displacement and determine an absolute or relative position. In a variant embodiment of the invention, the measuring instrument is a micrometer comprising a mobile probe driven by a micrometric screw and the measurement by the mobile probe is determined by a rotating encoder.

Figure 2:
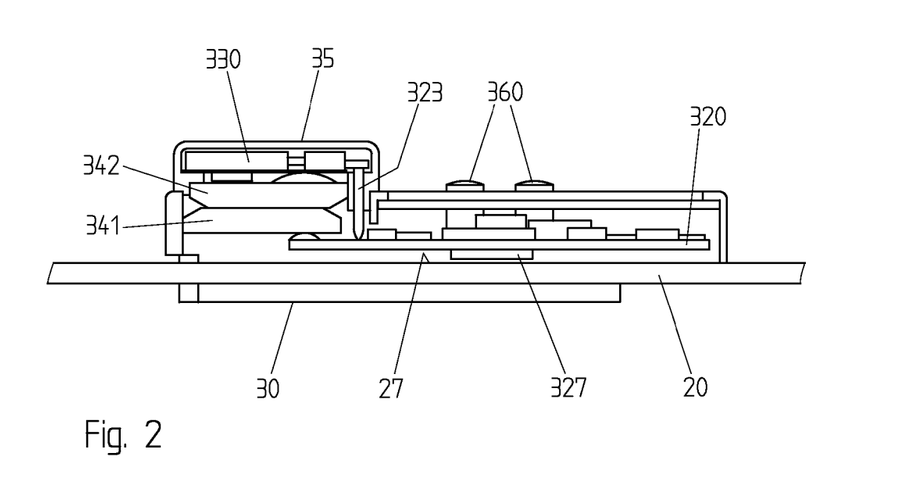
FIG. 2 represents a section of the slide of the caliper represented in FIG. 1.
Figure 4:
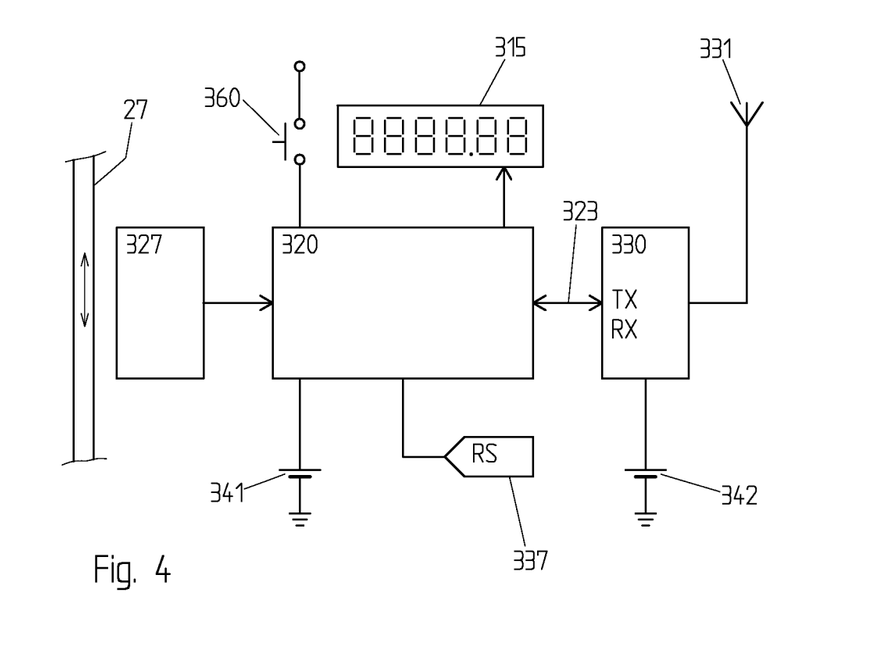
FIG. 4 illustrates diagrammatically the electronic circuit of a caliper according to one embodiment of the invention.

The measuring circuit 320 is powered by a battery 341, visible in FIGS. 2 and 4. Button cells, for example alkaline, silver oxide, mercury or Lithium, are typically found in this class of instrument, but accumulators could also be used. The battery is placed in a compartment of the slide 30 provided for this purpose and closed by a sealed lid 35 by means of an o-ring type joint, enabling access to the battery 341 and its replacement. The tightness can be expressed by a specific norm, for example IP65.

The instrument of the invention preferably also comprises manual data entering means or user interface, for example buttons 360, allowing different measuring modes to be selected or the instrument to be put into operation mode, wherein these functions can also be activated from an external system capable of transmitting commands to the device. Furthermore, the invention is designed so as to allow data and information to be stored and transmitted to external devices. The caliper includes a serial interface that can be of the type USB or RS232 or I2C or even another well-known communication bus standard for exchanging information through various communication means with external peripherals and devices. These means are not exclusive, as the system can adapt to several norms by means of appropriate programming. The interface is fully comprised within the cover 35, thus allowing the instrument's system to transmit or receive data, programs, programming commands, trigger commands and all information associated with the measurement preprocessing and processing, the operation of the instrument and communication.

The invention is integrated with the instrument so that the buttons existing on the instrument enable the displayed measurements to be transmitted by actuating the button dedicated to this use. This means that actuating this button enables the displayed values to be transmitted to an external device. The invention thus serves for transmitting the measurement but can also perform a value correction processing, such as for example a thermal compensation or format conversion.

In a variant embodiment, the instrument enables the invention to take control over the display and the buttons so that the user can access additional functions associated with the added module. It is thus possible to put the instrument in an operating mode where it only transmits measurement reports and allows the progress of the measurement plan to be controlled and the user to be notified of what needs to be measured and warned as to whether the measurement is satisfactory or insufficient. The measurement plan can include a certain number of selection commands so that the user can trigger actions from the instrument, these choices ranging from sending the result at the end of the measurement to choices depending on the measurement results during the progress of the measuring process.

In one embodiment of the invention, the transmission modes can be selected:
  a) Continuous transmission, i.e. where measurements are transmitted at regular intervals.
  b) Transmission by sending values, i.e. the user actuates a button of the instrument to send a value. Or in a minima detection mode, by activating the extrema measurement mode and the value measured during a predefined time interval being stabilized.
  c) Grouped transmission, i.e. the invention collects the measurements and sends them either by an action from the user, or at determined time intervals, or on the basis of a predefined number of measurements. This optimizes the communication time and the related power consumption.
  d) Transmission of the result, i.e. the invention processes a measurement plan comprising a series of measurements to be performed and then transmits the result of the measurement plan at the end of the processing operation. This is the most energy-efficient mode, as it does not transmit before having the full set of measurements. Furthermore, it stores the latter, which enables the measurements to be kept even in case of a transmission error.
  e) The processing of the measurement and of the tolerances is fully managed in a module that can be programmed over the transmission interface and the invention thus enables a measurement plan to be processed and indicates the plan's progress and potential errors. The result is not necessarily stored, but this allows a quick control of a series of identical parts.

Figure 3:
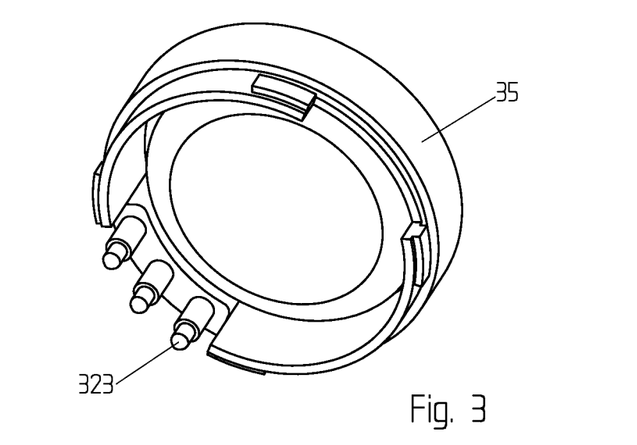
FIG. 3 illustrates a detail of a plug for accommodating the batteries of the caliper of FIG. 1.

According to one aspect of the invention, the instrument can accommodate the cover 35 illustrated in FIG. 3 which, in addition to its closing function, comprises an interface circuit for preparing and formatting the data 330 in view of their processing and storage or transmission; this interface is coupled with, for example, a current wireless radio transmission interface using standardized protocols and an antenna 33 that can be embedded in the cover's plastic, allowing the information to be transmitted to an external device that is not physically connected with the instrument. One can for example image a radio interface circuit according to the Bluetooth®, HomeRF®, WiFi® or ZigBee® standard or any other communication standard enabling data to be exchanged between the caliper 40 and a printer, a computer, a mobile telephone or any other device. The radio interface circuit 330 connects electrically to the measurement circuit 320 by one or several contact devices 323 to exchange data according to more or less extended protocols depending on the type of instrument.

In a variant embodiment of the invention, modules can be found that control the instrument and thus switch the instrument to a completely different mode than the normal operating mode, this with the aim of using it for measuring functions that are useless or impossible in a classical mode. In this embodiment, the instrument can be programmed to perform successive measurement series and, thanks to simple visual signals or sound effects from the instrument or from the system collecting the data, allows the operator to switch from one measurement to the next in the knowledge that the measurement has been performed and that, even in a variant embodiment, tolerance information is directly perceptible, thus enabling serial measurements to be performed. The invention can also include a removable memory for storing programs and measurements.

In a variant embodiment of the invention, the wireless element is paired with at least one other element so that the transmission can be determined in a predefined manner. This reduces the negotiation protocols between emitters and receivers and enables a quicker connection in a noisy environment. In this embodiment, the plugs are interchangeable and can advantageously afford the opportunity of use as an accumulator that is charged on one side whilst the other is used on the portable instrument. In this operating mode, the two plugs are transparent for communication and can thus interconnect the instrument directly with a computer interface, such as for example a USB communication port, requiring only very little material and software. In a variant embodiment, it is possible to use these plugs as gateway between any two apparatus provided with in- and out-USB. Furthermore, this pairing mode can include more than 2 transmission elements and it is thus possible to couple a display and a user interface with the other elements so that they interact together on a predefined transmission channel, the user can thus perform measurements even in conditions of difficult access or reduced visibility with maximum autonomy of the system.

Furthermore, the invention also comprises variant embodiments wherein the cover includes a data interface of a different nature, for example a USB interface, a serial interface, a wireless infrared or ultrasound communication device, depending on the use environment. This variant of the invention allows optional data interfaces for a variety of devices to be proposed without having to provide openings or specific connectors in the housing, but by using the available interface and the same opening of the battery compartment.

In a variant of USB connection, the power supply can be brought from an external system such as for example a computer by a simple stabilization circuit, if necessary, and one thus has a power source that does not require the addition of a battery to power either the instrument or the transmission. The system is therefore capable of remaining permanently powered and of transmitting the information in an easy manner and of affording the required tightness for the correct operation of the instrument, as the cable is fastened to the plug in a sealed manner.

The lid 330 preferably also comprises a second electric battery 342 designed to power the wireless data transmission interface. In this manner, adding the wireless data transmission interface does not discharge the instrument's battery 341 more quickly than in the conventional instrument, the caliper can also function normally when the battery 342 of the wireless interface is completely exhausted. In a variant embodiment of the invention, however, a power source common to the interface 330 and to the measuring circuit 320 could be used. In this case, one or more of the contact devices are used to connect the power supplies of the instrument and of the data interface 330, making it possible for example to put one or several batteries in parallel or to use batteries with a larger capacity with an electronic adaptation integrated in the battery plug in order to adapt if necessary different types of power sources. Furthermore, this operating mode is particularly suited in the case when the instrument is used only in a transmission mode and one wishes to know the batteries' charge state during the measurement.

The data interface 330 is used, for example, to transmit the measurement data to a printer or to a computer and to generate a measurement report. The caliper can include an automatic measurement mode in which the measuring circuit 320 detects the turning point of the distance between the jaws for the inside or outside measurement of a part and transmits only the measurements corresponding to a reached extremum corresponding to the measurement point during a predefined instant, thus allowing dimensions to be measured easily and quickly without validating each measurement by one of the buttons 360.

The interface circuit 330 is preferably bidirectional and also makes it possible to receive data originating from an external device, for example tolerance values, but also commands and instructions originating from the measurement trigger such as for example foot pedals, thus enabling a more accessible element than the instrument's buttons to be actuated in those cases where it could impair the measurement's accuracy. Similarly, the display could be reproduced on a computer or on an additional peripheral device, where the measurement indication is supplied in the form of a sound or visual signal enabling the operator to know the measurement result when there is no access to the instrument's display or when the operator's attention is concentrated on handling the instrument.

According to a variant embodiment of the invention, the caliper 40 can accommodate either a cover equipped with a bidirectional data interface 35 or a data processing interface or a complementary measurement interface of environmental variables (temperature, radiation, vibration, orientation, power supply, . . . ) or a storage interface or a combination of one or several of these elements, or a passive lid, of reduced height, enabling the portable device to be connected through a wired system with a computer. In this manner, it is possible to provide a cover/interface 35 as an accessory component without having to use dedicated fastening systems and without occupying the serial connector or another external connector. Furthermore, this type of serial system can provide a stable power supply without requiring a battery and affords a simplified connectivity, for example of the USB or serial type, whilst ensuring the tightness of the measuring instrument, since the cable is fixedly united with the cover in a totally sealed manner.

According to another variant embodiment of the invention, the lid can contain a support for a miniature removable memory card that allows measurement programs and measurements to be stored, thus making the device capable of performing preprogrammed series of measurements and of storing the results. The removable memory card then enables the results to be transmitted and the information to be reproduced on a computer by conventional memory card reading means.

According to a programmable variant, the system included in the cover is capable of processing the measurement information and of displaying a measurement status by means of a light or sound system from the instrument or its module or from an external peripheral device, thus enabling the operator to have direct information on the result, even in the case when the display cannot be read or in the case of instruments without a display. In this framework, the invention comprises a certain number of commands and instructions capable of defining the parameters of the operation and exchanging information with external peripheral devices or integrated warning systems.

In a variant embodiment, the invention also includes a secure mode enabling the contents of the system to be protected and limiting access during certain modes only to authenticated users. This mode is particularly required in programming options and remote control options to improve immunity towards external disruptions, on the other hand the transmissions can include modes with validation of the transmission, of the type checksum, parity, encrypting, reconstruction encoding etc., in particular in disruptive environments, in order to avoid data loss during transmission and malfunctions that could result therefrom.

Several types of covers of the invention can advantageously be used in interchangeable manner and are compatible with several different devices, on identical battery compartments, requiring only some data transmission contacts. By means of several adaptations, it is also conceivable to make adaptations on existing models to add more or less completely this type of solution by using already existing systems and communication norms.

The cover 35 of the invention is not limited only to data transmission but can instead comprise memory interfaces or programmable interfaces capable of quickly displaying programmed tolerance, conditional processing and all combinations of the different variants. Furthermore, it can adapt to different instruments and has a programming adapted for each situation. It can also automatically determine the type of instruments connected by means of information exchanged between the instrument, the invention and the external devices, but can also be preprogrammed to operate only with a restricted framework of use specific to one instrument. The system can contain one or several programs depending on the range of instruments covered, it can furthermore be reprogrammed for a range of instruments.

One independent aspect of the invention is a universal communication interface 330 that can be connected according to requirements with a variety of battery-powered instruments and that is conformed to fasten to the instrument's battery compartment and to close it so as to build a sealed volume. The inventive interface can be mounted on dimension-measuring instruments or also on other autonomous electronic devices, for example thermometers, weight-measuring instruments, etc.

Figure 5:
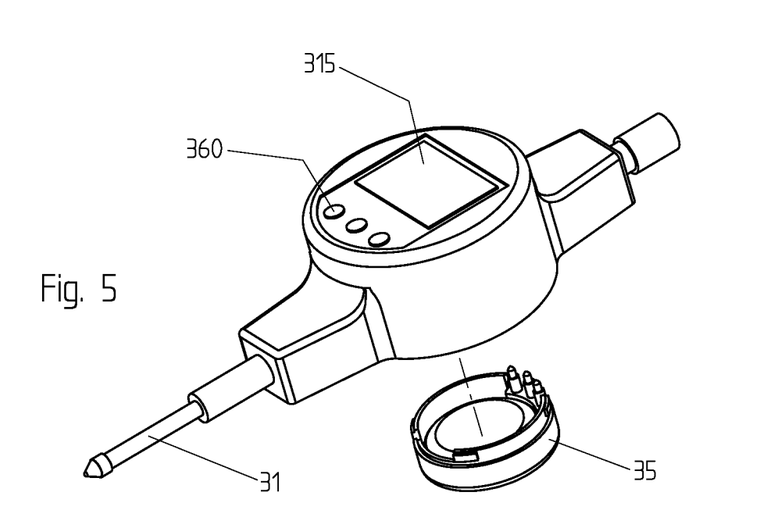
FIGS. 5 and 6 illustrate the application of a cover according to an independent aspect of the invention to a comparator resp. micrometer.
Figure 6:
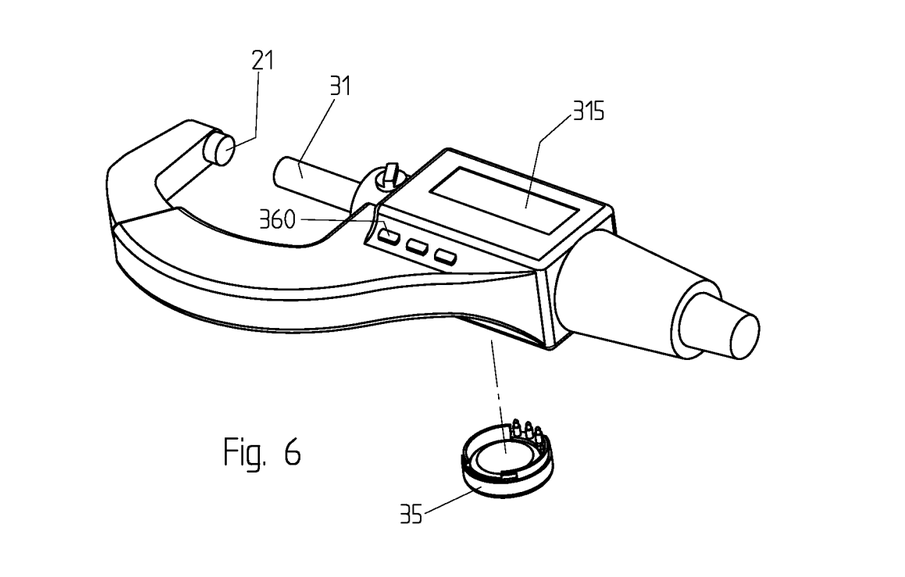

FIG. 5 shows an electronic comparator with a display 315, buttons 360 and a mobile probe 31, that can be combined with a cover 35 provided with a data interface according to the invention in order to communicate with external devices both measurement data as well as information serving to prepare and execute the measuring operation and to query the instrument's state. FIG. 6 illustrates a cover 35 according to the invention associated to a micrometer provided with a fixed probe 21, a mobile probe 31 and a display 315. It must be emphasized that the list of instruments capable of using this invention is not exhaustive and that the invention can be applied also to a height gauge, for example, or to any other instrument powered by a battery or having an emergency battery and that requires that a connection to an external system such as a computer be added to collect the data.

The examples presented refer to measuring instruments provided with a local user interface, for example a display 315 and control buttons 360. These characteristics, although desirable, are not essential for the invention. A cover 35 can in fact also be applied to an instrument without a user interface. Similarly, it is also conceivable to transform existing instruments by means of a flexible interface that is inserted in the exiting instrument to make it compatible with this invention or in certain cases to replace the measuring circuit so that it can interact with the invention in an optimum fashion.

According to another variant embodiment of the invention, the data interface contained in the cover 35 is a user interface, comprising for example a numeric display. It is thus possible to have, for example, slide calipers with direct readings without electronic display, which becomes an electronic instrument when it is equipped with the inventive interface, but also when the operator experiences difficulties in reading the display in places that are difficult to access it is useful to have a reminder of the display on an external display that can be freely placed and that is connected to the measuring instrument either through a wireless connection or through a wired connection. The second display can for example be provided with a holding magnet to position it on a magnetisable surface whilst the operator performs the measurement.

The caliper of the invention communicates wirelessly over the above-described interface with a base station in proximity, for example a personal computer equipped with a suitable wireless interface, or a bespoke device; the base station is arranged to estimate the distance to the instrument based on the information transmitted over the wireless link.

According to one aspect of the invention, the position of the portable instrument is determined simply by the presence of the absence of its characteristic signal. In this case, it is possible to determine whether a portable instrument is in the communication range of a given base station. In large workshops or factories, this coarse form of localization is often sufficient to locate mislaid instruments effectively.

If finer localization is needed, distance from the base station to the portable instrument can be estimated, for example, based on the signal strength and corresponding attenuation in the wireless link and/or by timing the transit time of information in the wireless link.

Figure 7:
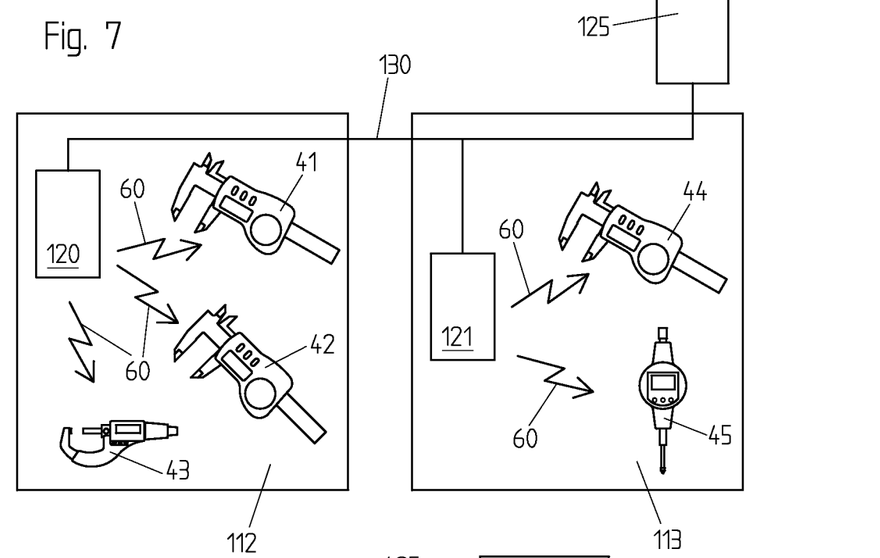
FIG. 7 represents schematically a system comprising a base station connected wirelessly to a plurality of instruments.

The invention thus relates also to a system comprising at least one base station and one or more portable dimensions-measuring devices including a wireless interface compatible with the interface of the base station, wherein the system is arranged to extract information about the position of the portable dimensions-measuring devices based on information transmitted over a wireless link between the wireless interfaces. An example of such a system is illustrated by FIG. 7, in which two base stations 120, 121 establish wireless connections 60 with the portable measuring instruments 41-45 that are located in the respective connection local domains 112, respectively 113. The connection local domain are determined by the maximal connection distance of the wireless interface that is, in a typical case, of some meters or ten of meters.

When one of the portable instruments 41-45 is powered, it requests a connection to a base station in proximity by its wireless interface. The base station receives the request and replies with an acknowledgement message, whereupon a logical wireless connection is established between the portable instrument 41-45 and the base station 120-121 that is within communication distance. Overlaps of local domains 112 and 113 may be dealt with by choosing the base station that has the strongest signal, or by any other suitable means.

The wireless connections 60 comprise a transmission of an identification code of the portable instruments to the connected base station. Base stations 120, 121 maintain a database of the connected instruments, whereupon the presence of a determined portable instrument in the connection local domain can be deduced. Preferably, the base station are arranged to reply to localization requests received over the network 130, allowing a system-wide search of an instrument from any of the base stations 120, 121 or from another node 125 of the network 130.

In a possible example, the portable instrument transmits a connection request over the wireless interface during its power-up sequence, or periodically at stated intervals. The base station responds to the connection request by acknowledging the connection request and determining the distance by appropriate means. According to another aspect of the invention, the base station is arranged to transmit a warning to the portable instrument when a maintenance operation is needed, for example if the calibration of the instrument is going to expire, or is expired. The expiration of a calibration can be determined based on the time elapsed from the last calibration, on the historic record of the previous measures, and on future measurement programs.

According to a variant of the invention, the portable instrument is arranged to block the measurements upon reception of a calibration expiration warning, until a new calibration is performed. In this manner, it is guaranteed that the measures of the instruments are valid and calibrated at all times. Provisions to override this block can be also included, if appropriate.

The invention thus relates also to a system comprising at least one base station and one or more portable dimensions-measuring devices including a wireless interface compatible with the interface of the base station, wherein the base station is arranged to transmit a warning to the portable dimensions-measuring devices over a wireless link between the wireless interfaces when a recalibration of the instrument is needed or foreseen.

According to a further variant, the system of the invention the portable instrument is arranged to communicate the measured dimensions to a base station over a suitable wireless interface, and the base station returns an acknowledgement of reception, preferably including a validation of the measurement.

The validation of the measurement preferably includes a value based on the measured value and one or more predetermined criteria, for example a binary value confirming that the received measurement is within the measurement range of the instrument or that the measure is comprised within a given tolerance interval, or only other suitable value. Further, the present invention also comprises a variant in which the base station is arranged to transmit a measurement set-up to one or several portable measurement instruments, to execute specific measurement, for example a verification that a measurement is comprised between predetermined tolerance levels. Preferably the instrument has a 'slave mode' that is activated upon reception of a set-up from the base station, in which the measurement set-up is protected against local modifications.

Figure 8:
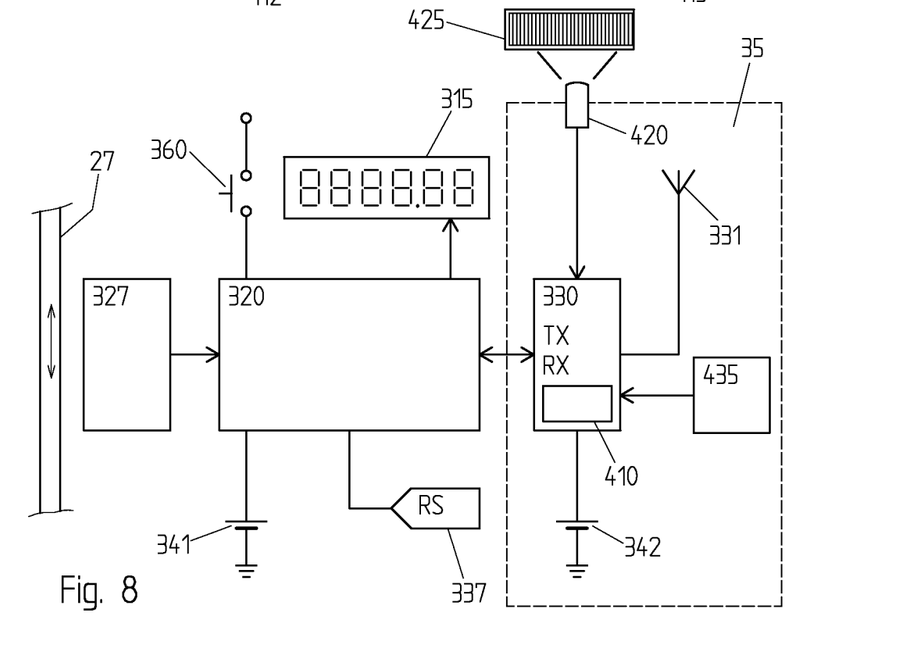
FIG. 8 shows schematically a caliper as in FIG. 3, in which the cover of the battery compartment includes special features to assist traceability of the data.

FIG. 8 relates to a variant of the invention that is especially adapted to the use in processes that demand a high level of traceability and a rigourous quality control, like for example, biomedical, aerospace, military or other similar applications. According to this embodiment the portable instrument includes, preferably included in the communication interface or in the cover 35 of the battery compartment, a barcode scanner 420 adapted for reading a barcode 425, or a 2D barcode.

In non-illustrated variants, the barcode scanner 420 could be replaced by an image detector, a RFID receiver, or another workpiece-identification means for reading indicia allowing the identification of a workpiece, or of a group of workpieces.

Thanks to these features, the operator of the inventive instrument can scan the barcode of a workpiece that is measured, and the barcode is transmitted together with the measurement over the wireless inverface. The base station can store the measurement into a suitable database in relation to the identity of the of the workpiece as determined by the barcode 425, and ensure in this way the traceability of the measurement.

According to another aspect, the instrument or the cover 35 of the battery compartment includes a thermometer, an hygrometer, or another suitable environmental sensor 435 arranged to measure the temperature, or another environmental parameter, together with the measure of dimension. In this way, the portable instrument can determine whether the dimension has been measured in an acceptable temperature range. In alternative, the temperature, or the environmental parameter, is transmitted together with the measurement to an external station over the wireless interface, and the base station stores the measurement and the temperature into a suitable database, for future traceability.

In to another independent aspect of the present invention, the data interface system 330 includes a personal code 410, preferably in a non-erasable memory, that allows its identification. The code 410 is preferably unique.

According to this embodiment, each operator receives an individual battery cover 35 that includes a personal code 410 correlated with its individual identity in an appropriate database. The code 410 can then be used to trace and verify the operator's identity.

To carry out the measurement tasks, the operator connects his or her individual battery cover with the needed instrument, for example a caliper, and measures a number of assigned workpieces. The data interface 330 transmits over the wireless interface the dimensional measurement, together with the operator's unique personal code 410, and preferably with a workpiece identification read by the barcode scanner and/or with a temperature reading. All these data are stored and correlated by a remote receiving system in such a manner as to ensure future traceability.

REFERENCE NUMBERS USED IN THE FIGURES 20 shaft
21 fixed jaw, fixed probe
27 ruler
30 slide
31 mobile jaw, mobile probe
35 cover of the battery compartment
40 caliper, sliding caliper, measuring instrument
41-45 portable measuring instrument
60 wireless connection
112-113 local domain of connection
120-121 base station
125 node
130 network
315 display
320 measuring circuit
323 electric contacts
327 encoder
330 data interface
331 antenna
337 wired interface
341 battery of the measuring circuit
342 battery of the data interface
360 push button
410 ID memory
420 barcode scanner
425 barcode
435 environmental sensor

The invention claimed is:

1. A portable dimensions-measuring instrument comprising:
an electronic circuit arranged for determining a data from a measurement originating from a sensor; and
a compartment provided with an internal power source sealably closed by a removable replacement cover enabling said internal power source to be replaced, characterized in that the removable replacement cover consists in an essentially cylindrical lid having an open end, a curved side, and a closed end that includes a data communication interface circuit at the closed end, capable of performing the information communication between said measuring circuit and a receiver device, an inner space between the open end and the closed end for lodging one or more button cells, and electric contacts on the curved side of the lid, connecting the data communication interface and said measuring circuit, wherein said removable replacement cover closes said compartment when it is installed on the same measuring instrument forming, together with said communication interface, a sealed volume with the instrument, said removable replacement cover including, inside the sealed volume, electric contacts connecting said data communication interface circuit and said measuring circuit, wherein the sealed volume has IP65 tightness and encloses said data communication interface, said electric contacts, and said one or more button cells.

2. The portable dimensions-measuring instrument of claim 1, further comprising a display connected with said electronic circuit arranged for displaying an indication of a dimension measurement obtained by said sensor.

3. The portable dimensions-measuring instrument of claim 1, wherein said compartment contains a first button cell for the measuring circuit and the removable replacement cover includes a second button cell independent from the first, for the data communication interface.

4. The portable dimensions-measuring instrument of claim 1, wherein said data communication interface is bidirectional, the portable dimension-measuring instrument including a data processing circuit enabling the instrument's measurements to be managed according to programmable instructions.

5. The portable dimensions-measuring instrument of claim 1, wherein said communication interface includes a radio interface or a serial interface or a data storage interface and a programmable measurement processing system for managing the results and controlling the instrument during the measurements.

6. The portable dimension-measuring instrument of claim 1, wherein said communication interface includes one or more of: barcode scanner, workpiece identification means, thermometer, environmental sensor, personal identification code.

7. A communication interface connectable with a portable dimensions-measuring instrument enabling commands and measurements to be communicated between said measuring instrument and an external device, wherein, the portable dimension-measurement instrument has a battery compartment;

the removable replacement cover consisting in an essentially cylindrical lid having an open end, a curved side, and a closed end that includes the communication interface circuit at the closed end, an inner space between the open end and the closed end for lodging one or more button cells, and electric contacts on the curved side of the lid, connecting the data communication interface and said measuring instrument;

the communication interface is arranged to be fastened to the battery compartment; and the communication interface closes said battery compartment when it is installed on the measuring instrument in order to form a sealed volume with the instrument, wherein said volume has IP65 tightness, and encloses said data communication interface, said electric contacts, and said one or more button cells.

8. The communication interface of claim 7, wherein said data communication interface is a radio communication interface or a serial communication interface or a storage interface or a data processing interface or an interface enabling the user interface to be shifted towards an element external to the instrument.

9. The communication interface of claim 7, wherein the portable dimension-measuring instrument has a first, button cell, and the communication interface has a second power source independent from the first power source, wherein the second power source can also come from an external equipment through a wired communication interface.

10. The communication interface of claim 7, wherein electric contacts for the transmission of the power and of the data connect said communication interface and said measuring instrument when the interface is installed on the measuring instrument.

11. The communication interface of claim 7, wherein said data communication interface is bidirectional, being capable of receiving measurement trigger commands through external trigger devices and/or instruction programs, commands and updates.

12. The communication interface of claim 7, wherein said data processing interface enables execution programs and measurements of the instrument to be stored and is capable of performing environment measurements and corrections in order to reduce the measurement errors.

13. The interface of claim 7, further comprising one or more of: barcode scanner, workpiece identification means, thermometer, environmental sensor, personal identification code.

14. A system comprising:
at least one base station having a first wireless interface; and
one or more portable dimensions-measuring devices including:
a second wireless interface compatible with the first wireless interface of the base station, arranged to extract information about the position of the portable dimensions-measuring devices based on information transmitted over a wireless link between the wireless interfaces, wherein the second wireless interface is lodged in an essentially cylindrical lid having an open end, a curved side, and a closed end, the communication interface being at the closed end, the lid comprising an inner space between the open end and the closed end for lodging one or more button cells, and electric contacts on the curved side of the lid, connecting the data communication interface and said dimension-measuring device;
said lid being arranged to be fastened in the location of the battery compartment on said dimension-measuring device such that the wireless interface is sealed within a sealed space, wherein the sealed volume has IP65 tightness, and encloses said data communication interface, said electric contacts, and said one or more button cells.

* * * * *